(12) United States Patent
Kubo et al.

(10) Patent No.: US 6,545,710 B1
(45) Date of Patent: *Apr. 8, 2003

(54) IMAGE PICK-UP APPARATUS

(75) Inventors: Hiroaki Kubo, Settsu (JP); Takeshi Ogoshi, Amagasaki (JP); Toru Ishii, Hirakata (JP); Gen Sasaki, Toyonaka (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/694,431

(22) Filed: Aug. 8, 1996

(30) Foreign Application Priority Data

Aug. 11, 1995 (JP) ............................................... 7-205663
Aug. 11, 1995 (JP) ............................................... 7-205664

(51) Int. Cl.[7] ................................................. H04N 9/73
(52) U.S. Cl. .................................. 348/223.1; 348/228.1
(58) Field of Search ................................. 348/207, 222, 348/223, 224, 225, 228, 242, 244

(56) References Cited

U.S. PATENT DOCUMENTS

| | | | | |
|---|---|---|---|---|
| 5,241,575 A | | 8/1993 | Miyatake et al. | |
| 5,436,660 A | * | 7/1995 | Sakamoto | 348/207 |
| 5,526,048 A | * | 6/1996 | Yamamoto | 348/223 |
| 5,568,195 A | * | 10/1996 | Suzuki | 348/227 |
| 5,583,397 A | * | 12/1996 | Takei | 348/223 |
| 5,691,772 A | * | 11/1997 | Suzuki | 348/223 |
| 6,040,858 A | * | 3/2000 | Ikeda | 348/242 |

* cited by examiner

Primary Examiner—Wendy R. Garber
Assistant Examiner—Jacqueline Wilson
(74) Attorney, Agent, or Firm—Burns, Doane, Swecker & Mathis, LLP

(57) ABSTRACT

An image pick-up apparatus includes: an image sensing section which photoelectrically converts light from an object into an electrical output having a logarithmic function in relation to an amount of the light to produce image data regarding a light image of the object; an extracting section which extracts a particular portion having a specified luminance from the light image; a discriminating section which discriminates whether the particular portion has a light source; a data generating section which generates white balance adjustment data of the image data at a specified interval; and a changing section which changes the generation interval based on a result of the discriminating section. This apparatus can assure suitable and accurate color correction in accordance with a changed light source and for each of a variety of photographic scenes.

12 Claims, 11 Drawing Sheets

IMAGE PICK-UP APPARATUS

BACKGROUND OF THE INVENTION

This invention relates to an image pick-up apparatus including an image pick-up device such as a CCD and, particularly to adjustment of white balance of a picked up image.

In a color video camera or still video camera for reading a light image incident upon a lens by converting it into electrical signals, spectral sensitivity characteristic of an image sensor in use such as a CCD (Charge Coupled Device) is fixed. In the case that a color temperature of a light source of an object varies, a color deviation is caused in a picked up image and, accordingly, the white balance of the signal representing the picked up image is normally read in order to correct this color deviation.

The white balance can be adjusted by adjusting a ratio of levels of color components of red (R), green (G) and blue (B) of the picked up image based on an image data of a high luminance portion (white portion) of the picked up image where a color temperature information of the light source is included. However, since a CCD having a linear photoelectric conversion characteristic, i.e., a CCD which outputs a voltage in proportion to an amount of incident light is used in the conventional color video cameras and still video cameras, a dynamic range in relation to a luminance range of the object is insufficiently wide and the color temperature information of the light source cannot accurately be extracted from the high luminance portion of the picked up image. A white balance adjusting method using the image data of the high luminance portion is not adopted.

FIG. 13 shows a photoelectric conversion characteristic of a conventional CCD image sensor. In FIG. 13, abscissa is an amount of incident light and ordinate is an output voltage of the image sensor. Also, OJ1 denotes people under a tree, OJ2 denotes people under the sun light, OJ3 denotes a distant object in clear day, OJ4 denotes an object on a skiing slope, and OJ5 denotes a mass of snow in a clear day.

As indicated, by a characteristic curve ① of FIG. 13, the image sensor used in the conventional video camera has a linear photoelectric conversion characteristic with which it outputs a voltage in proportion to the amount of incident light with the intensity of the light being a slope (inclination of the characteristic curve ①. The range of the amount of incident light in relation to the dynamic range (portion A1) is narrow. If an image is picked by controlling only an exposure time of the image sensor, the image of the high luminance portion (portion A2) including the color temperature information of the light source is subject to overflow. Particularly in the video camera using a CCD of complementary color and single plate type, color modulation carriers saturate, thereby changing colors. Accordingly, in view of color reproducibility, the dynamic range becomes even narrower.

Thus, if the white balance is adjusted based on the image data of the high luminance portion from which a precise color temperature information of the light source cannot be obtained, the color deviation gets worse.

The image in the high luminance portion can be read without causing an overflow by restricting the amount of incident light via an aperture to change the slope of the characteristic curve ① into that of a characteristic curve ② and by controlling the amount of incident light and the exposure time to expand the dynamic range of the image sensor. However, such an exposure control cannot be performed since it leads to a reduction in a signal-to-noise (S/N) ratio of a main object. Therefore, the white balance adjustment based on the image data of the high luminance portion is not adopted.

Since a reliable light source information cannot be obtained from the high luminance portion due to the photoelectric conversion characteristic of the image sensor, the white balance has conventionally been adjusted based on image signals from a portion having a relatively high brightness and a low saturation.

More specifically, the image signals of R-, G-, B-components are converted into a Y-signal (luminance signal) and a C-signal (chrominance signal). The white balance is adjusted based on the image signals from a portion where the C-signal is below a specified level and the Y-signal is above a specified level.

However, according to the above-mentioned conventional white balance adjusting method, the color temperature information of the light source is estimated based on the image data of the portion having a relatively high brightness and a low saturation. Accordingly, the accuracy and reliability of the white balance adjustment values are not satisfactory. It has been difficult to perform a suitable color correction for a variety of photographic scenes, such as an against-the-sun scene, a clear-day scene and a night scene, where the color temperature of the light source differs.

Further, data used to adjust the white balance are renewed in a specified cycle so that the color deviation can be corrected even when the color balance of the image changes due to a variation of the light source of the object and a variation of a screen construction.

In the case that the image changes as in an operation of photographing a moving object under the same light source, if the white balance is adjusted according to the change of the image, the color balance becomes unstable each time the moving object changes, making it uncomfortable to see images. Accordingly, it is not preferable to; frequently adjust the white balance.

However, in the case that the cycle in which the white balance adjustment data are renewed is set long, no white balance adjustment is made when the light source of the object changes, thereby making the color deviation likely to occur. For this reason, it is preferable to perform a white balance adjustment according to change in the light source of the object.

As mentioned above, however, the color temperature of the light source cannot be precisely estimated in the conventional method. Therefore, it has been very difficult to perform a white balance adjustment according to the change of the light source of the object.

SUMMARY OF THE INVENTION

It is an object of the present invention to provide an image pick-up apparatus which has overcome the problems residing in the prior art.

It is another object of the present invention to provide an image pick-up apparatus which makes it possible to accurately detect a color temperature of a light source with use of an image sensor having a photoelectric conversion characteristic of logarithmic output type, and then perform an easy and accurate color correction based on a detected color temperature.

It is still another object of the present invention to provide an image pick-up apparatus which makes it possible to accurately detect a color temperature of a light source with use of an image sensor having a photoelectric conversion characteristic of logarithmic output type, and then assure a suitable color correction in accordance with a changed light source.

It is yet still another object of the present invention to provide an image pick-up apparatus which makes it possible to accurately detect a color temperature of a light source with use of an image sensor having a photoelectric conversion characteristic of logarithmic output type, and then assure a suitable color correction for each of a variety of photographic scenes.

The present invention is directed to an image pick-up apparatus comprising: an image sensing section which photoelectrically converts light from an object into an electrical output having a logarithmic function in relation to an amount of the light to produce image data regarding a light image of the object; a detecting section which detects a color temperature of a light source in connection with the object based on image data from the image sensing section; and a correcting section which corrects image data from the image sensing section based on a detected color temperature.

The detecting section may be made to detect a color temperature of the light source based on image data regarding a particular portion of the light image having a specified luminance.

The image sensing section may be preferable to have a changeable photoelectric conversion range in relation to an amount of the light and the specified luminance of the particular portion is changeable with a changed photoelectric conversion range.

The correcting section may preferably generate white balance adjustment data and corrects image data based on the generated white balance adjustment data. The white balance adjustment data may be generated based on image data regarding a high luminance portion of the light image and image data regarding a portion other than the high luminance portion.

The detecting section may be made to calculate an accuracy of premise that the light image has a light source. In this case, the correcting section is made to generate white balance adjustment data in accordance with a calculated accuracy.

Also, the present invention is directed to an image pick-up apparatus comprising: an image sensing section which photoelectrically converts light from an object into an electrical output having a logarithmic function in relation to an amount of the light to produce image data regarding a light image of the object; an extracting section which extracts a particular portion having a specified luminance from the light image; a discriminating section which discriminates whether the particular portion has a light source; a data generating section which generates white balance adjustment data of the image data at a specified interval; and a changing section which changes the generation interval based on a result of the discriminating section.

It may be appreciated to further provide a calculating section which calculates an accuracy of the discrimination of the discriminating section. In this case, the changing section is made to change the generation interval based on a calculated discrimination accuracy. An interval longer than a predetermined interval may be preferably set when the accuracy is higher than a predetermined value.

It may be appreciated to further provide a detecting section which detects a color temperature of a light source in the particular portion. In this case, the data generating section is made to generate white balance adjustment data based on a detected color temperature, of the light source. Also, the white balance adjustment data may be generated based on image data regarding a high luminance portion of the light image and image data regarding a portion other than the high luminance portion.

Further, the present invention is directed to an image pick-up apparatus comprising: an image sensing section which photoelectrically converts light from an object into an electrical output having a logarithmic function in relation to an amount of the light to produce image data regarding a light image of the object; an extracting section which extracts a particular portion having a specified luminance from the light image; an estimating section which estimates a photographic scene based on image data regarding the particular portion; and a correcting section which corrects image data from the image sensing section based on a result of the estimating section.

The estimating section may estimate a photographic scene based on a color temperature of the particular portion, an area of the particular portion, or a luminance level of the particular portion, or a combination of a color temperature, an area, and a luminance level of the particular portion.

With thus constructed image pick-up apparatus, light from an object is photoelectrically converted into an electrical output having a logarithmic function in relation to an amount of the light. A color temperature of a light source is detected based on image data. The image data is corrected based on a detected color temperature. Accordingly, an accurate color temperature of a light source is detected, which thereby assuring more accurate color correction.

Also, a particular portion having a specified luminance is extracted from the light image. It is discriminated whether the particular portion has a light source. White balance adjustment data is generated at an interval which is determined by a result of the discriminating section. This construction will assure a color correction suitable for a changed light source.

Further, a particular portion having a specified luminance is extracted from the light image and a photographic scene is estimated based on image data regarding the particular portion. Image data from the image sensing section is corrected based on a result of the estimating section. Accordingly, color correction can be accurately performed for each of a variety of photographic scenes.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
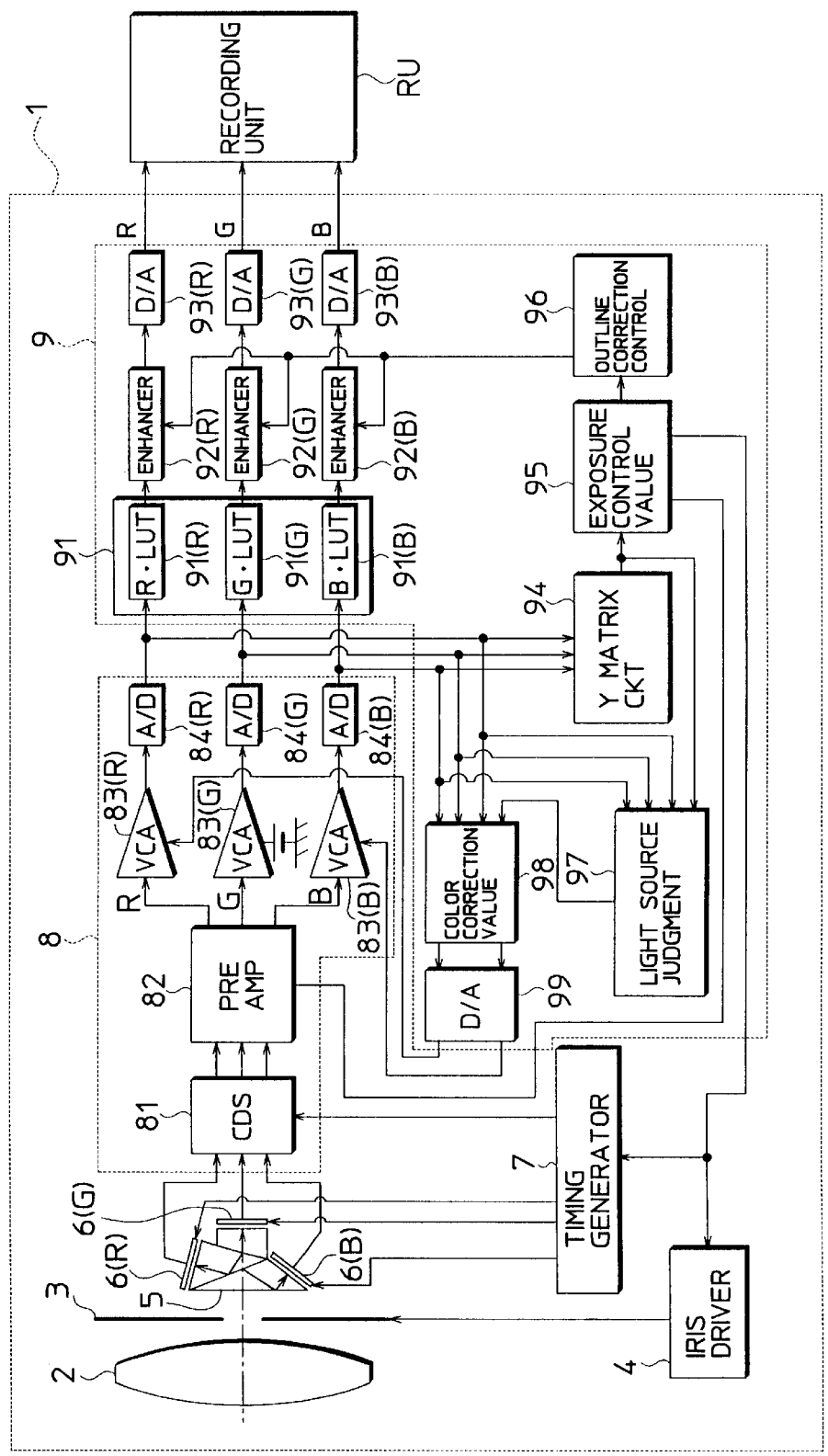
FIG. 1 is a block diagram showing a construction of an image pick-up apparatus of an embodiment of the invention.

FIG. 1 is a block construction diagram of an image pick-up apparatus embodying the invention. An image pick-up apparatus 1 is provided with an optical unit for introducing a light reflected by an object (an object light image) to an image sensing unit, the image sensing unit for reading the object light image by converting it into electrical signals (image signals), and a signal processing unit for processing the image signals obtained by the image sensing unit.

The optical unit includes a lens system 2 for focusing the object light image on a sensing surface of the image sensing unit, an iris 3 for protecting a CCD image sensor while no image is sensed, and an iris driver 4 for controlling the driving of the iris 3. The iris driver 4 controllably opens and closes the iris 3 based on an exposure control value input from an exposure control value calculating circuit 95 to be described later. In other words, the iris driver 4 opens the iris 3 immediately before the start of the image picking up operation by the CCD image sensor 6, and closes the iris 3 after the lapse of a specified exposure time so as to prevent a light from being incident upon the CCD image sensor 6 while no image is sensed.

The image sensing unit includes a dichroic prism 5 for separating the incident light into three primary color components of R (red), G (green) and B (Blue), three CCD image sensor 6(R), 6(G), 6(B) for reading the object light image of R-, G-, B-components output from the dichroic prism 5, and a timing generator 7 for controlling the driving of the CCD image sensors 6(R), 6(G), 6(B).

Although the image sensing unit includes the CCD image sensor of three plates type in this embodiment, it may include a CCD image sensor of single plate type.

Figure 3:
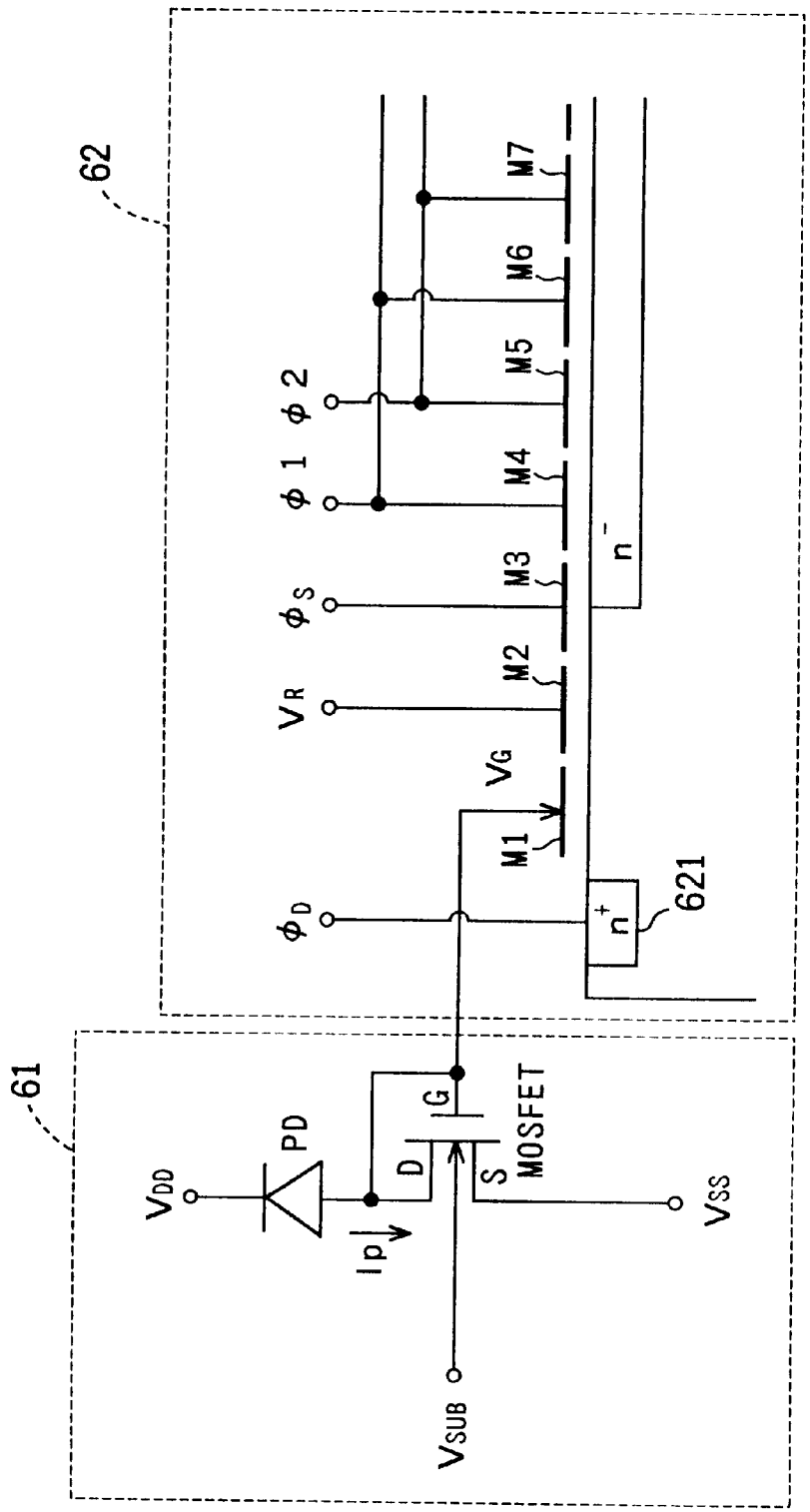
FIG. 3 is an equivalent of respective pixels of an image sensor.

The CCD image sensor has a photoelectric conversion characteristic with which an output voltage has a logarithmic function in relation to an amount of incident light, and each pixel thereof is constructed by a circuit shown as an equivalent in FIG. 3.

Each pixel includes a photosensitive portion 61 for photoelectrically converting the amount of incident light into a logarithmically compressed voltage and outputting the same, and a charge storing portion 62 for storing electric charges based on the output voltage of the photosensitive portion 61.

The photosensitive portion 61 includes a p-n junction type photodiode PD for photoelectrically converting the incident light into an optical current Ip proportional to the intensity of the incident light and an n-channel MOS type field effect transistor FET (hereinafter, "MOSFET") for converting the optical current Ip into a logarithmically compressed voltage $V_G$.

The anode of the photodiode PD is connected with a drain (D) and a gate (G) of the MOSFET, and a supply voltage $V_{DD}$ is applied to the cathode of the photodiode PD. Further, the gate (G) of the MOSFET is connected with a first electrode M1 of the charge storing portion 62, and a dc (direct current) voltage $V_{SS}$ and a dc voltage $V_{SUB}$ are applied to a source (S) and a back gate (substrate) of the MOSFET.

Here, $V_{DD} > V_{SS} > V_{SUB}$. Reverse bias is applied to the photodiode PD, the source (S), drain (D) and back gate of the MOSFET.

The charge storing portion 62 includes an input diode 621 for discharging excess electric charges, and a two-phase drive type CCD having a first electrode M1 for controlling a voltage produced by the stored electric charges, a second electrode M2 for storing electric charges, a third electrode M3 for controlling the reading of the stored electric charges, a fourth electrode for transferring the read stored electric charges, and other electrode(s).

To the input diode 621 is input a control pulse $\phi_D$ (low level pulse signal) for controlling the start of the storing of electric charges in the charge storing portion 62. To the electrode M1 is input the gate voltage $V_G$ of the MOSFET.

A dc voltage $V_R$ used to adjust an offset level of a dynamic range and a shift pulse $\phi_S$ (high level pulse signal) used to control the completion of the electric charge storing in the charge storing portion 62 are applied to the second and third electrodes M2 and M3, respectively. A first transfer pulse $\phi 1$ and a second transfer pulse $\phi 2$ used to control the reading of the stored electric charges are applied to even numbered electrodes M(2i+2)(i=1, 2, . . . ) and to odd numbered electrodes M(2i+3) of the fourth and subsequent electrodes, respectively. It should be noted that the first transfer pulse $\phi 1$ and the second transfer pulse $\phi 2$ are pulse train signals the phases of which are shifted by $\pi$.

Here, the operations of the photosensitive portion 61 and the charge storing portion 62 are described.

When a threshold voltage $V_T$ satisfies $(V_G - V_S) \leq V_T + (nkt/q)$, it is known that a fine current called a sub-threshold current $I_{DS}$ defined by Equation (1) flows into the drain (D) of the MOSFET.

$$I_{DS} = \left(\frac{W}{L}\right) \cdot \left(\frac{C_O}{m}\right) \cdot \mu_m K^2 \cdot \exp\{(V_G - V_S - V_T)/K - 1)\} \times [1 - \exp\{-m(V_D - V_S)/K\}] \quad \text{Equation (1)}$$

where W: channel width of the MOSFET
L: channel length of MOSFET
$\mu_n$: electron mobility
q: electric charge amount of electrons
k: Boltzmann's constant
T: absolute temperature
$C_O$: capacity of a gate insulation layer
$C_d$: capacity of a depletion layer
$N_{fs}$: surface state density
$V_G$: gate voltage
$V_S$: source voltage
$V_D$: drain voltage
$V_T$: threshold voltage
$m = (C_O + C_d)/C_O$
$n = (C_O + C_d + C_{fs})/C_O$
$C_{fs} = q \cdot N_{fs}$
$K = nkT/q$ In Equation (1), if the surface state density $N_{fs}=0$ (i.e. $C_{fs}=0$) and $(K/n)<<(V_D-V_S)$, n=m, $1<m(V_D-V_S)$ and $\exp\{-m(V_D-V_S)/K\}\approx0$. Accordingly, Equation (1) can be rewritten into Equation (2).

$$I_{DS} = I_{DSO} \cdot \exp\{(V_G - V_S - V_T)/K\} \quad \text{Equation (2)}$$

$$I_{DSO} = \left(\frac{W}{L}\right) \cdot \mu_n \cdot \left(\frac{C_o}{m}\right) \cdot K^2 \cdot \exp(-1)$$

From Equation (2), if the threshold voltage $V_T$ satisfies $(V_G-V_S)\leq V_T+K$ and $(K/n) <<V_D-V_S=V_G-V_S$, i.e. $(K/n) <<(V_G-V_S)\leq(V_T+K)$, the sub-threshold current IDS flowing into the drain (D) of the MOSFET is found to be an exponential function of a voltage difference $(V_G-V_S)$ between the gate and the source.

On the other hand, the threshold voltage $V_T$ is expressed by Equation (3) and, thus, changes according to $(V_{SS}(=V_S)-V_{SUB})$. Accordingly, if the operative state of the MOSFET is so set as to satisfy the above condition $(K/n)<<(V_G-V_S)\leq V_T+K$ by suitably adjusting the dc voltage $V_{SUB}$, the optical current $I_P=I_{DSO}\cdot\exp\{V_G-V_{SS}-V_T)/K\}$ since $I_D=I_P$ in the circuit construction. Thus, the logarithmically compressed gate voltage $V_G$ expressed by Equation (4) is output to the gate (G) of the MOSFET.

$$V_T = \Phi_{MS} - q \cdot N_{fs}/C_o + 2\Phi_f + \quad \text{Equation (3)}$$
$$\sqrt{\{2\varepsilon_{si}\cdot\varepsilon_0\cdot q\cdot N_S\cdot(|2\Phi_f|+V_{SS}-V_{SUB})/C_o\}}$$

where $\phi_{MS}$: difference of a work function of a gate electrode and that of a silicon substrate $\phi_f$: Fermi level of the silicon substrate $\in_{sf}$: dielectric constant of silicon $\in_O$: vacuum dielectric constant $N_S$: concentration of impurities in the silicon substrate $$V_G=V_{SS}+V_T+(nkT/q)\cdot\text{Log}_e(I_P/I_{DSO}) \quad \text{Equation (4)}$$

Accordingly, when the light is incident upon the photosensitive portion 61, the optical current $I_P$ proportional to the intensity of the incident light flows from the cathode of the photodiode PD to the anode thereof, thereby being supplied to the drain (D) and the gate (G) of the MOSFET. The optical current $I_P$ is output from the gate (G) of the MOSFET after being converted into a logarithmically compressed voltage. In other words, the incident light is photoelectrically converted into the logarithmically compressed voltage in relation to the intensity thereof in the photosensitive portion 61, and the thus obtained voltage is output from the photosensitive portion 61.

On the other hand, in the charge storing portion 62, potential wells are formed right below the respective electrodes M1, M2, ..., and electric charges corresponding to the gate voltage $V_G$ of the MOSFET are stored in the potential well right below the second electrode M2.

The higher voltages are applied to the corresponding electrodes, the deeper the respective potential wells are and the lower the potential level for the electric charges is. Accordingly, the higher the dc voltage VR is made, the deeper the potential well right below the second electrode M2 becomes, making the capacity to store electric charges in this well larger.

Electric charges corresponding to a maximum capacity $C_{MAX}$ (amount of electric charges corresponding to the dynamic range of the CCD) determined by the dc voltage $V_R$ are stored in the potential well right below the second electrode M2. Thereafter, the upper limit level of this well is lowered based on the gate voltage $V_G$ of the MOSFET for a specified exposure period, thereby discharging an amount of electric charges $C_{Log}$ (amount of electric charges corresponding to an exposed amount) corresponding to the amount of incident light.

Accordingly, when the exposure control is completed, an amount $C_{INT}$ (=$C_{MAX}-C_{Log}$) of electric charges which are the electric charges stored at the maximum capacity $C_{MAX}$ minus the amount $C_{Log}$ of electric charges proportional to the gate voltage $V_G$ (logarithmically compressed electric charges with respect to the amount of incident light), electric charges corresponding to the amount $C_{Log}$ are stored in the potential well. Since the charge amount $C_{INT}$ is a luminance value obtained by subtracting the luminance of the object from the dynamic range (sensitivity range) of the charge storing portion 62, it is a negative signal representing a black/white inverted object luminance.

The electric charges stored in the potential well right below the second electrode M2 are read as follows. The shift pulse $\phi_S$ is input upon the lapse of the exposure period, thereby making the potential level right below the third electrode M3 lower than the potential level right below the second electrode M2. The electric charges are read by being discharged to a transfer portion right below the fourth electrode M4 through the portion right below the third electrode M3.

Figure 4:
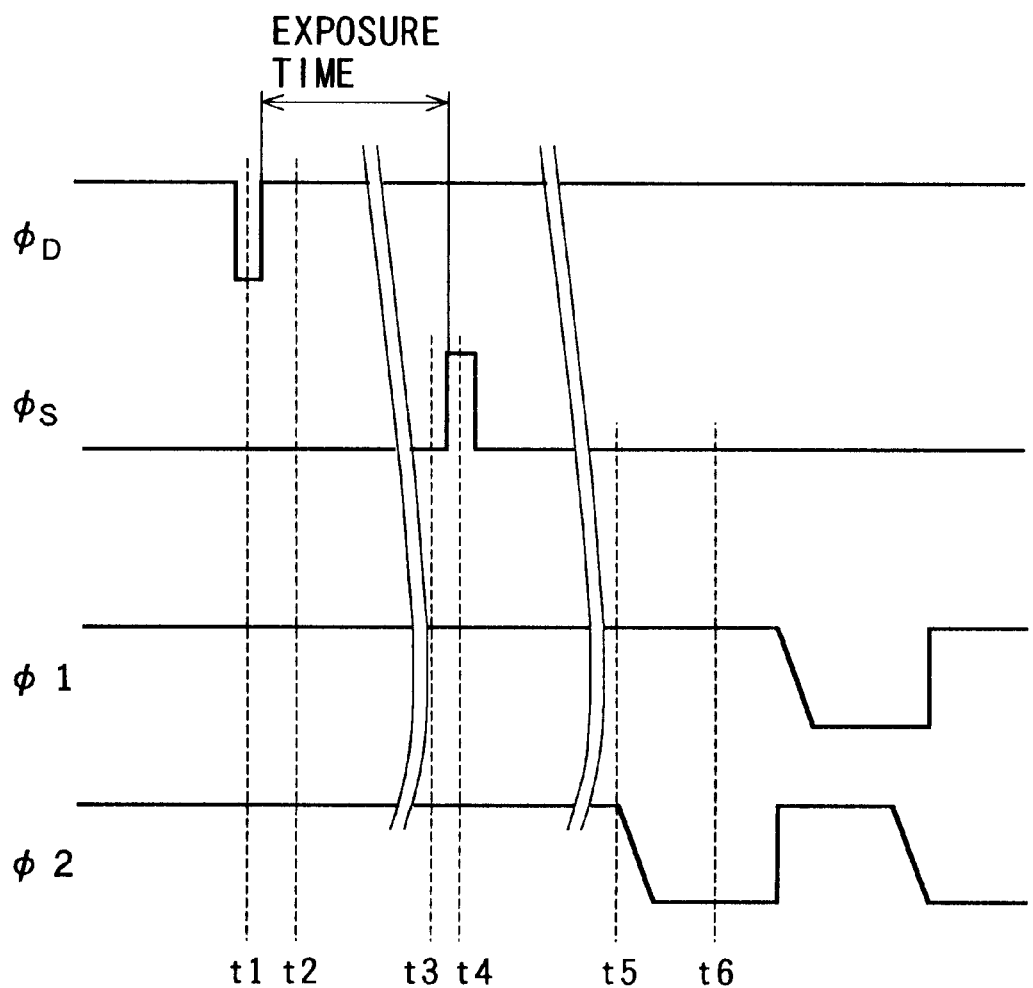
FIG. 4 is a timing chart for drive control of the image sensor.
Figure 5:
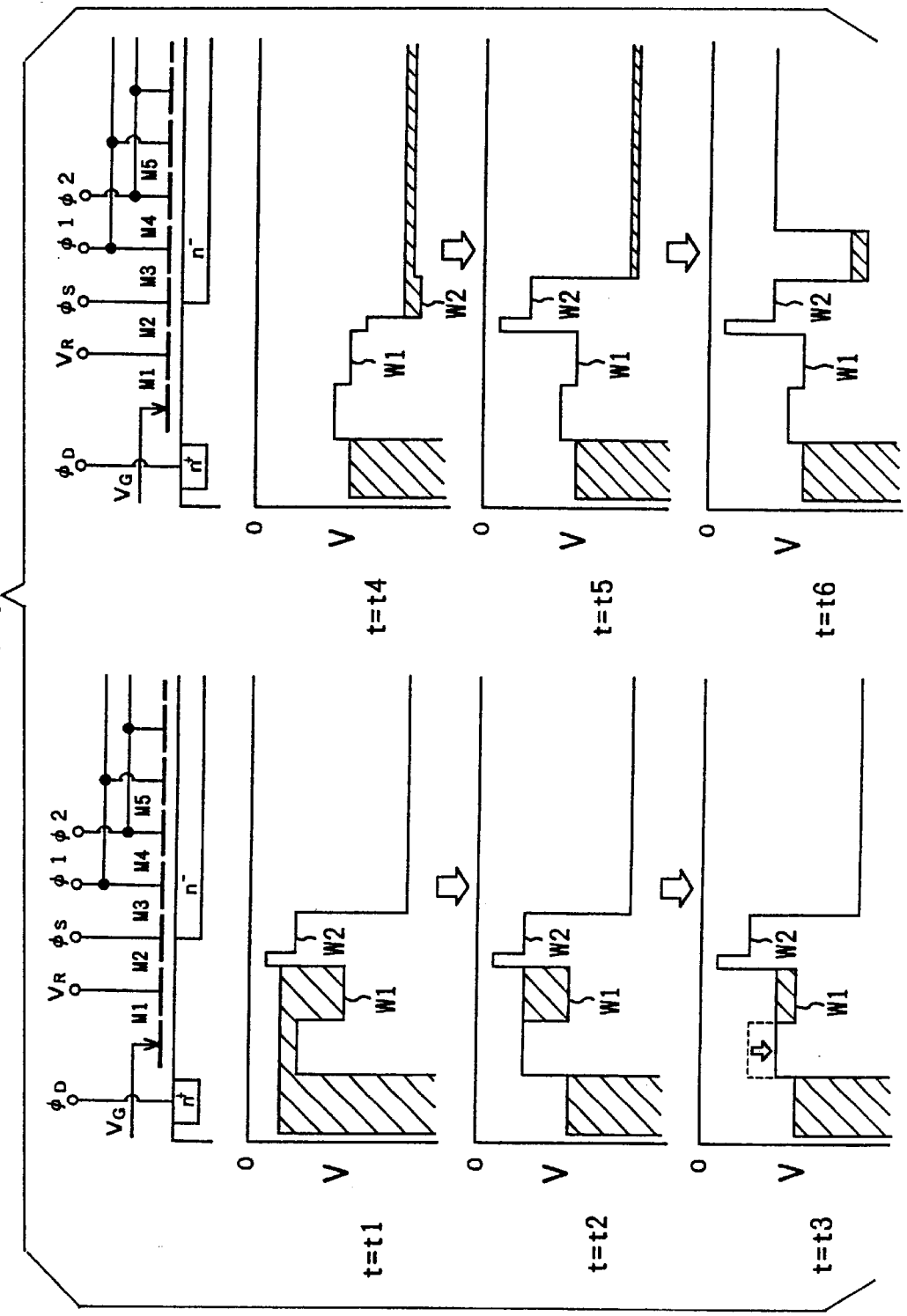
FIG. 5 shows respective potential states of a charge storing portion at timings t1 to t6 of the timing chart of FIG. 4.

FIG. 4 is a timing chart showing the electric charge storing and the charge transfer in the charge storing portion 62, and FIG. 5 shows the potential state of the charge storing portion 62 at each timing defined by the timing chart of FIG. 4. Hatched portions in FIG. 5 denote electric charges.

In FIG. 4, time t1 and time t4 denote an exposure start timing and an exposure completion timing, respectively. When the control pulse $\phi_D$ falls to low level at t=t1, electrons are poured into the potential well W1 right below the second electrode M2 from the input diode 621 through the portion below the first electrode M1 as shown in a left and top section of FIG. 5. When the control pulse $\phi_D$ rises to high level at t=t2, excess electrons of the potential well W1 are discharged to the input diode 621 through the portion below the first electrode M1 and, at the same time, the electric charge storing (exposure) is started as shown in a left and middle section of FIG. 5.

More specifically, upon the input of the control pulse $\phi_D$, the CCD is reset by pouring the electric charges into the potential well W1 up to the maximum capacity $C_{MAX}$, thereby starting the exposure.

Upon the start of the exposure, the gate voltage $V_G$ of the MOSFET increases in accordance with a logarithmically compressed characteristic in relation to the amount of incident light. The potential right below the first electrode M1 becomes deeper according to this increase of the voltage, with the result that the electric charges of the potential well W1 are discharged to the input diode 621 through the portion below the first electrode M1 as shown in a left and bottom section of FIG. 5.

Thus, electric charges corresponding to the amount $C_{INT}$ (=$C_{MAX}-C_{Log}$) remain in the potential well W1. The amount $C_{INT}$ is a function of the potential difference between the dc voltage VR and the gate voltage VG. Since the amount $C_{Log}$ of electric charges discharged during the exposure time is based on a logarithmic characteristic in relation to the gate voltage $V_G$, the amount $C_{INT}$ also has a logarithmic characteristic.

When the shift pulse $\phi_S$ rises to high level at t=t4, the level of the potential well W2 right below the third electrode M3 becomes lower than that of the potential well W1, with the result that the electric charges remaining in the potential well W1 are transferred to the potential well W2 below the third electrode M3 and the exposure is completed as shown in a right and top section of FIG. 5. When the shift pulse $\phi_S$ falls to low level at t=t5, the level of the potential well W2 becomes higher than that of the potential well W1, with the result that the stored electric charges are transferred to the potential wells (shift register) right below the fourth and subsequent electrodes, making it possible to read the stored electric charges to the signal processing unit as shown in a right and middle section of FIG. 5.

Thereafter, every time the first or second pulse $\phi 1$ or $\phi 2$ is input after t=t6, the fourth and subsequent electrodes M (i+3) (i=1, 2, . . . ) are alternately and successively changed to low level in synchronism with the first or second pulse $\phi 1$ or $\phi 2$. The stored electric charges are transferred to the potential wells right below the fourth and subsequent electrodes M one after another, and are read to the signal processing unit as shown in a right and bottom section of FIG. 5.

Figure 6:
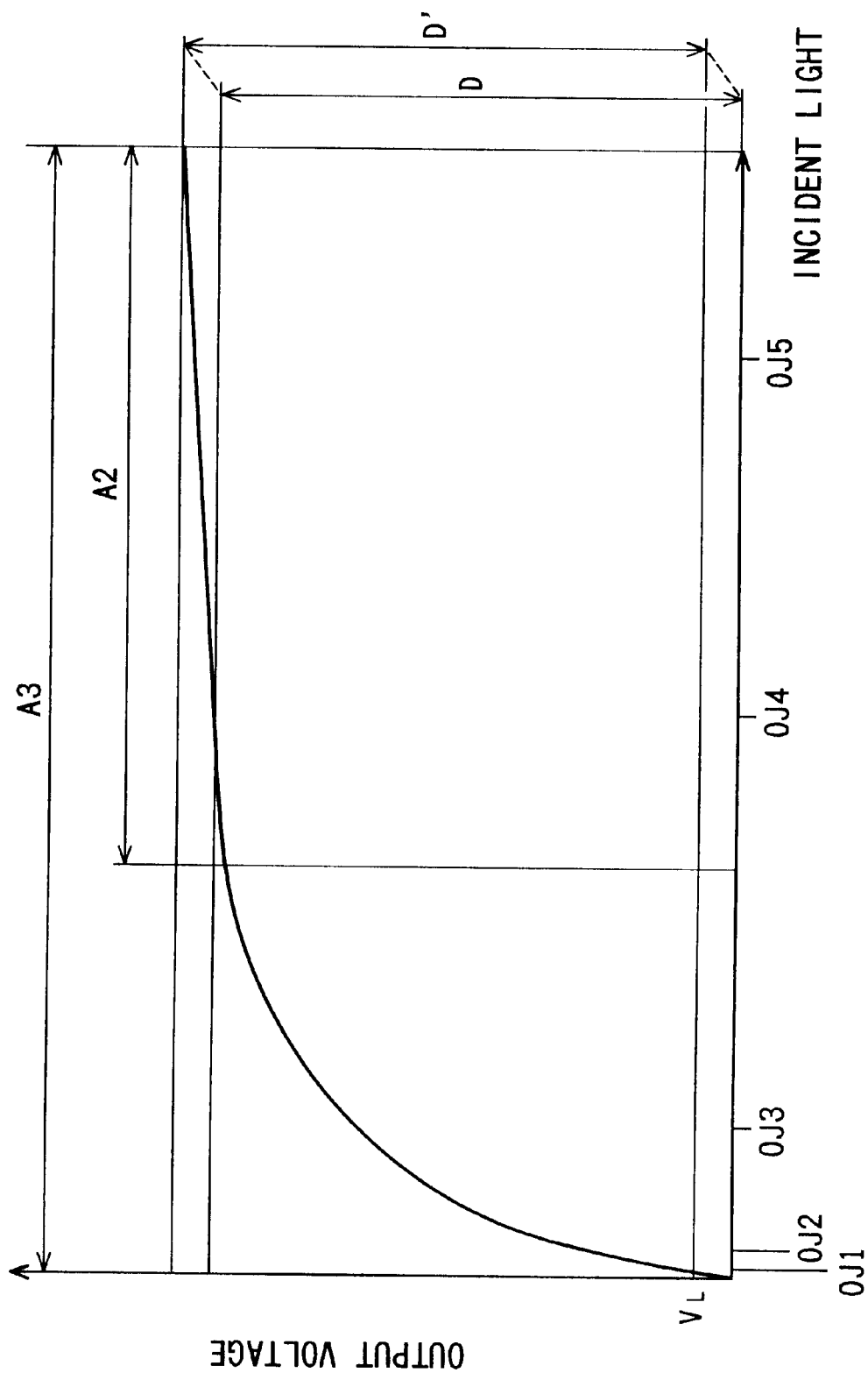
FIG. 6 is a graph showing a photoelectric conversion characteristic of the image sensor.

As described above, since the CCD image sensor 6 outputs the incident light from the object after converting it into electrical signals logarithmically compressed in relation to the intensity of the incident light, it has a photoelectric conversion characteristic as shown in FIG. 6.

In FIG. 6, abscissa and ordinate are an amount of incident light and an output voltage of the image sensor, respectively. OJ1 denotes people under a tree, OJ2 denotes people under the sun light, OJ3 denotes a distant object in clear day, OJ4 denotes an object on a skiing slope, and OJ5 denotes a mass of snow in a clear day.

Figure 13:
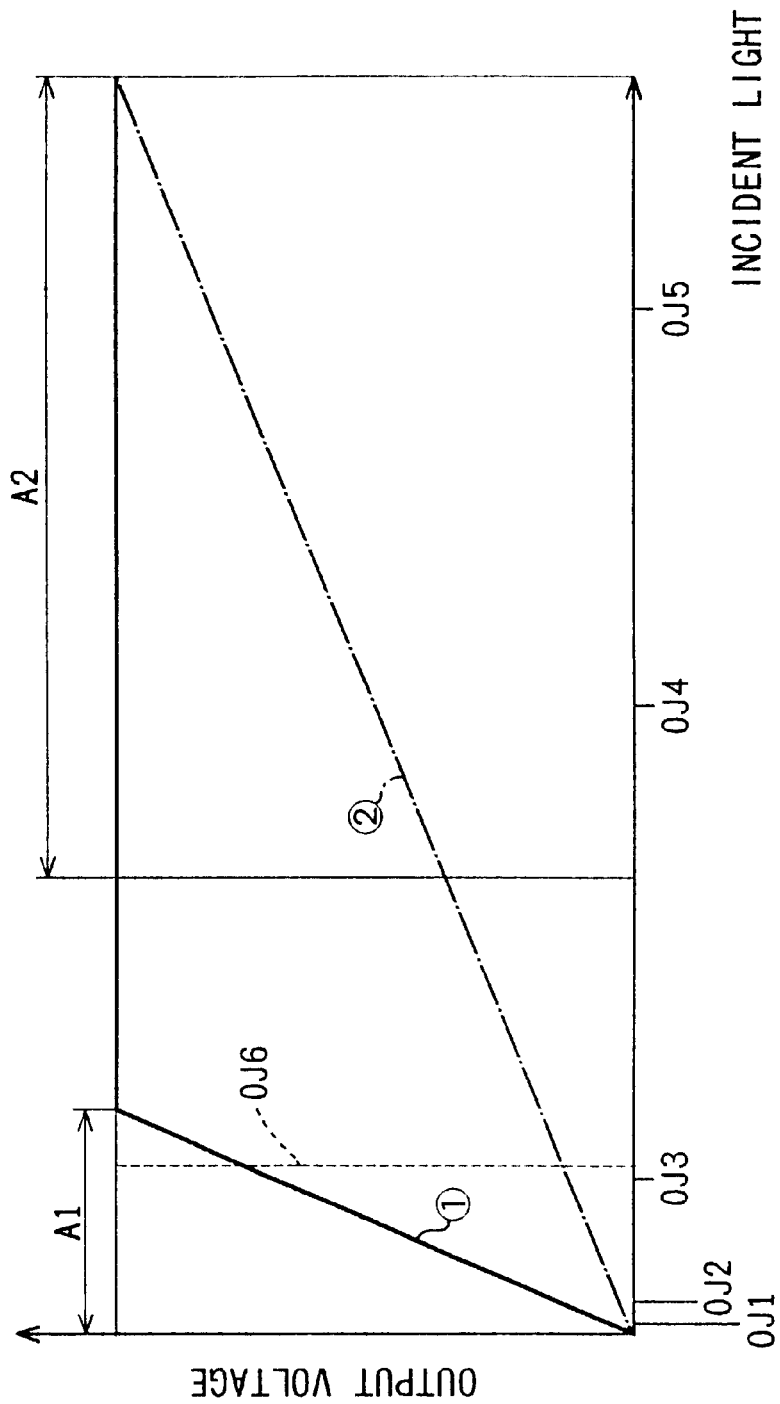
FIG. 13 is a graph showing a photoelectric conversion characteristic of a conventional CCD image sensor.

Since the normal CCD image sensor has a linear photoelectric conversion characteristic (see FIG. 13) as described above, the range A1 of the amount of incident light in relation to the range of the output voltage of the CCD (dynamic range) is very narrow. For example, if an object standing on a skiing slope or in snow in a clear day is to be photographed by controlling only the exposure period of the CCD image sensor, the output of the high luminance portion of the background is subject to overflow. This considerably damages the density balance of the photographed image.

In view of the above, in a camera using the normal CCD image sensor, an aperture is provided to restrict the amount of incident light from the object, and the slope of the photoelectric conversion characteristic curve of the CCD image sensor by adjusting the amount of incident light and the exposure period, so as to expand the dynamic range.

On the other hand, the CCD image sensor 6 according to the invention has a non linear photoelectric conversion characteristic of outputting a logarithmically compressed voltage as shown in FIG. 6. Accordingly, a portion A3 of the amount of incident light in relation to the output voltage range (dynamic range) D is remarkably wide. A proper exposure can be obtained for the dynamic range A3 without adjusting the amount of incident light by means of the aperture and the charge storing time control as with the prior art CCD image sensor.

Further, as described above, the dc voltage $V_R$ determines the depth of the potential well W1 right below the second electrode M2, and the dynamic range of the CCD image sensor 6 changes according to the dc voltage $V_R$. This is equivalent to a change of an offset level $V_L$ of the dynamic range of the CCD image sensor 6 according to the dc voltage $V_R$ in FIG. 6.

Since a proper exposure can be obtained in the dynamic ranges D' to D by adjusting the dc voltage $V_R$ in the CCD image sensor 6, the exposure control is performed on the basis of the dc voltage $V_R$ in the image pick-up apparatus 1.

Referring back to FIG. 1, the timing generator 7 generates clocks used to control the driving of the CCD image sensors 6(R), 6(G), 6(B) and a correlational double sampling circuit 81, and also a variety of control signals, such as the control pulse $\phi_D$, the shift pulse $\phi_S$, the first and second transfer pulses $\phi 1$, $\phi 2$, in accordance with an exposure value input from the exposure control value calculating circuit 95.

The signal processing unit is provided with an analog signal processor 8 for applying a specified processing to the image signals (analog signals) output from the image sensing unit to convert them into digital signals and a digital signal processor 9 for applying specified processing to the image signals converted into the digital signals (hereinafter, image data) and outputting the same.

The analog signal processor 8 includes the correlational double sampling circuit 81 (identified by CDS in FIG. 1 and hereafter "CDS circuit 81") for suppressing the noise level of the image signals output from the CCD image sensor 6, a preamplifier 82 for amplifying the image signals to a specified standard level, and a white balance circuit 83 (hereafter "WB circuit 83") for adjusting the white balance of the image signals, and an analog-to-digital (A/D) converter unit 84 for converting the analog image signals into digital image signals.

The WB circuit 83 includes three WB amplifiers (identified by VCA in FIG. 1) for adjusting gains of the image signals of R-, G-, B-components, sets the image signal of G-components as a specified reference level, and adjusts the levels of the image signals of R- and B-components in accordance with amplifier gain control values $AG_R$, $AG_B$ input from a color correction value calculating circuit 98 via a digital-to-analog (D/A) converter 99.

The A/D converter unit 84 includes three A/D converters 84(R), 84(G), and 84(B), and converts pixel signals constituting the respective image signals of R-, G-, B-components into a 10-bit image data. This image data is input to a γ correction circuit unit 91, a Y matrix circuit 94, a light source judgment circuit 97, and the color correction value calculating circuit 98.

The digital signal processor 9 includes the γ correction circuit unit 91, an enhancer unit 92, the D/A converter unit 93, the Y matrix circuit 94., the exposure control value calculating circuit 95, an outline correction control circuit 96, the light source judgment circuit 97, the color correction value calculating circuit 98 and a D/A converter 99. The γ correction circuit unit 91 corrects a γ characteristic of the image data input from the A/D converter unit 84. The enhancer unit 92 corrects the outline of the image data. The D/A converter unit 93 converts the image data after the digital signal processing into analog signals and outputs the analog signals to a recording unit RU where the signal is then recorded on a record medium, such as video tape. The Y matrix circuit 94 generates a luminance data based on the image data of R-, G-, B-components. The exposure control value calculating circuit 95 generates an exposure control value (dc voltage $V_R$), a gain adjustment value of the preamplifier 82 and a γ correction table of the γ correction circuit unit 91 based on the luminance data generated by the Y matrix circuit 94. The circuit 96 controls the outline correction by the enhancer unit 92. The circuit 97 detects the color temperature of the light source based on the image data and calculates a detection accuracy. The circuit 98 calculates the amplifier gain control values. The D/A converter 99 converts the amplifier gain control values output from the circuit 98 into analog data.

The γ correction circuit unit 91 includes three γ correction circuits 91(R), 91(G), 91(B) so as to correspond to the image data of R-, G-, B-components. The respective γ correction circuits 91(R), 91(G), 91(B) apply a γ correction to the respective pixel data constituting the image data of R-, G-, B-components using a look-up table for correcting gradation which is generated by the exposure control value calculating circuit 95. During this correction, each pixel data is converted from a 10-bit data into an 8-bit data.

In this embodiment, since a logarithmic conversion is performed at the input side, a range of the input image is wide. Accordingly, when the image is input, it is necessary to convert the level of the main object into a suitable value based on the input image and to let the level after the conversion have an optimal γ characteristic. The exposure level adjustment and the γ correction are applied to this output in the respective γ correction circuits 91(R), 91(G), 91(B).

The enhancers unit 92 also includes three enhances so as to correspond to the image data of R-, G-, B-components. The respective enhancers 92(R), 92(G), 92(B) emphasize the edges of the image by adding outline signals to the image data along horizontal and vertical directions in accordance with an output control signal input from the outline correction control circuit 96, thereby making the obtained image reproducible with a better resolution.

The D/A converter unit 93 also includes three D/A converters 93(R), 93(G), 93(B) so as to correspond to the image data of R-, G-, B-components, and outputs the image data after the specified signal processing after converting them into analog signals.

The Y matrix circuit 94 generates the luminance data by combining the image data of R-, G-, B-components at a specified ratio (e.g., R:G:B=0.33:0.59:0.11) close to a relative luminosity factor. The luminance data is input to the exposure control value calculating circuit 95 and the light source judgment circuit 97, and is also input to the outline correction control circuit 96 via the exposure control value calculating circuit 95.

The exposure control value calculating circuit 95 calculates the dc voltage $V_R$ of the CCD image sensor 6 and the gain adjustment values of the preamplifier 82 based on the luminance data generated by the Y matrix circuit 94 using a table set in advance, and outputs the dc voltage $V_R$ and the gain adjustment value to the timing generator 7 and the preamplifier 82, respectively.

The outline correction control circuit 96 sets outline emphasis levels for the image data of R-, G-, B-components based on the luminance data, and outputs as outline control signals to the enhancers 92(R), 92(G), 92(B).

The light source judgment circuit 97 extracts image data of a high luminance portion of a specified level from the image data of R-, G-, B-components, detects the color temperature of the light source based on the extracted image data, and calculates a white balance adjustment data WBD1 (R1/G1, B1/G1). It should be noted that R1, G1, B1 denote average levels of the image data of R-, G-, B-components included in the high luminance portion, respectively.

The light source judgment circuit 97 calculates an accuracy of detecting the color temperature of the light source, and generates a control signal used to generate the amplifier gain control values ($AG_R$, $AG_B$) based on the calculated result.

As described later, the amplifier gain control values ($AG_R$, $AG_B$) are generated by adding the white balance adjustment data WBD1 calculated based on the image data of the high luminance portion and a white balance adjustment data WBD2 (R2/G2, B2/G2) calculated based on the image data of a portion excluding the high luminance portion (hereinafter, "low luminance portion") at a specified ratio α and by taking inverses of the addition result. The above control signal is a signal for designating the addition ratio α. It should be noted that R2, G2 and B2 are average levels of the image data of R-, G-, B-components included in the low luminance portion.

The color correction value calculating circuit 98 extracts the image data of the low luminance portion based on the image data of R-, G-, B-components, and calculates the white balance adjustment data WBD2 based on the extracted image data. Further, the circuit 98 adds the white balance adjustment WBD2 and WBD1 at the addition ratio α input from the light source judgment circuit 97, and calculates the amplifier gain control values ($AG_R$, $AG_B$) by taking inverses of the addition result. The amplifier gain control values ($AG_R$, $AG_B$) are input to the WB amplifiers 83(R), 83(B) of the WB circuit 83 after being converted into analog signals by the D/A converter 99.

Figure 2:
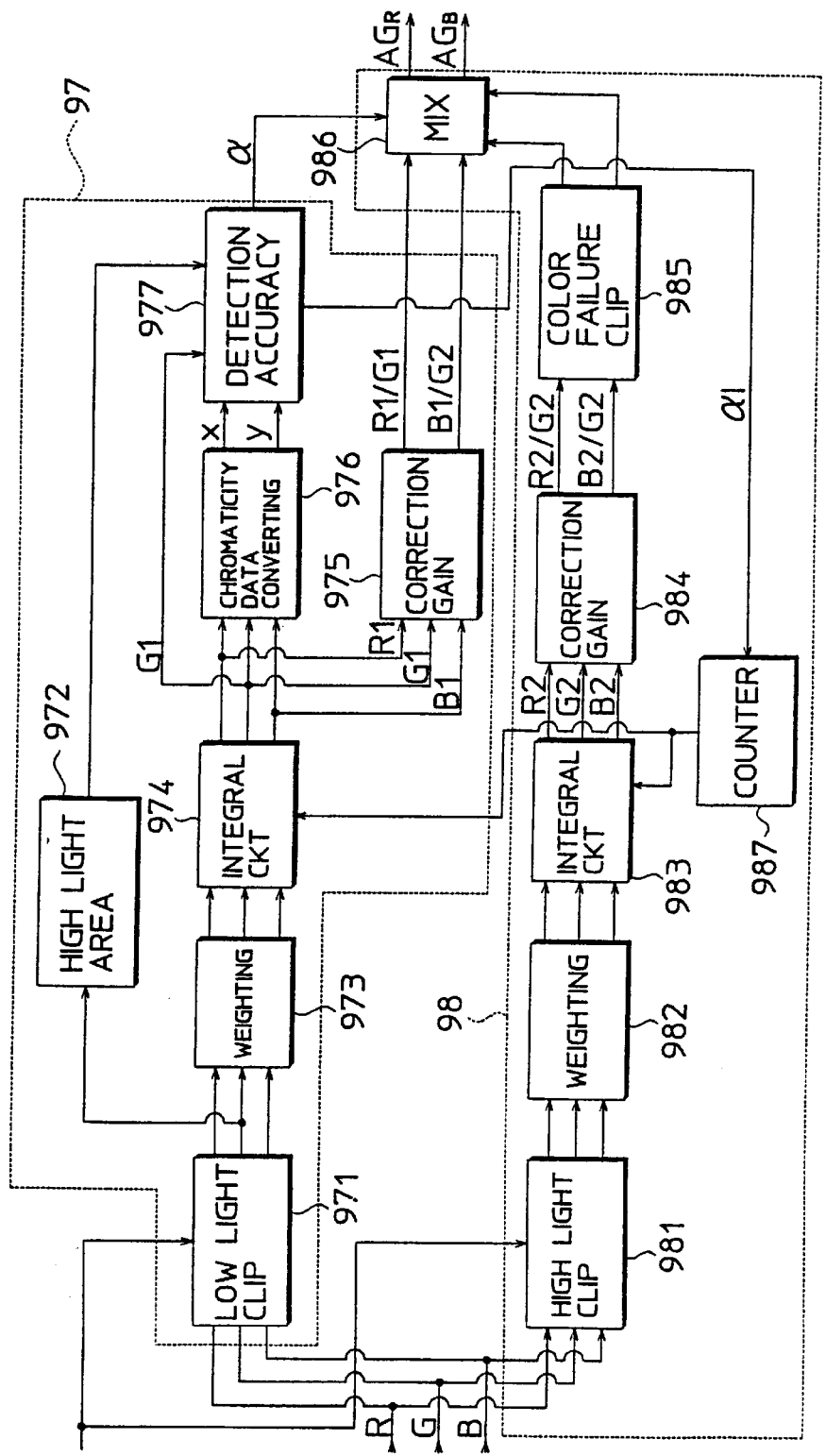
FIG. 2 is a circuit diagram showing a construction of a light source judgment circuit and a color correction value calculation circuit.

FIG. 2 is a circuit construction diagram of the light source judgment circuit 97 and the color correction value calculating circuit 98.

The light source judgment circuit 97 includes a low light clipping circuit 971 (portion extraction section), a high light area calculating circuit 972, a weighting circuit 973, an integral circuit 974, a color correction gain calculating circuit 975, a chromaticity data converting circuit 976 and a light source detection accuracy calculating circuit 977.

On the other hand, the color correction value calculating circuit 98 includes a high light clipping circuit 981, a weighting circuit 982, an integral circuit 983, a color correction gain calculating circuit 984, a color failure clipping circuit 985, a mixing circuit 986 and a counter 987.

The dc voltage $V_R$ output from the timing generator 7 and the image data of R-, G-, B-components are input to the low light clipping circuit 971 and the high light clipping circuit 981.

The low light clipping circuit 971 clips the low luminance portion of the image data at a specified clipping level, and extracts only the image data from the high luminance portion. The clipping level is variably settable according to the dc voltage $V_R$ of the CCD image sensor 6, i.e. the offset level of the dynamic range. By setting the clipping level, a portion of the image data indicative of the color temperature of the light source (portion upon which the light from the light source is directly incident) or a portion reflecting the color temperature of the light source (portion which the light from the light source is incident via specular reflection) can be accurately extracted as an absolute value.

Figure 7:
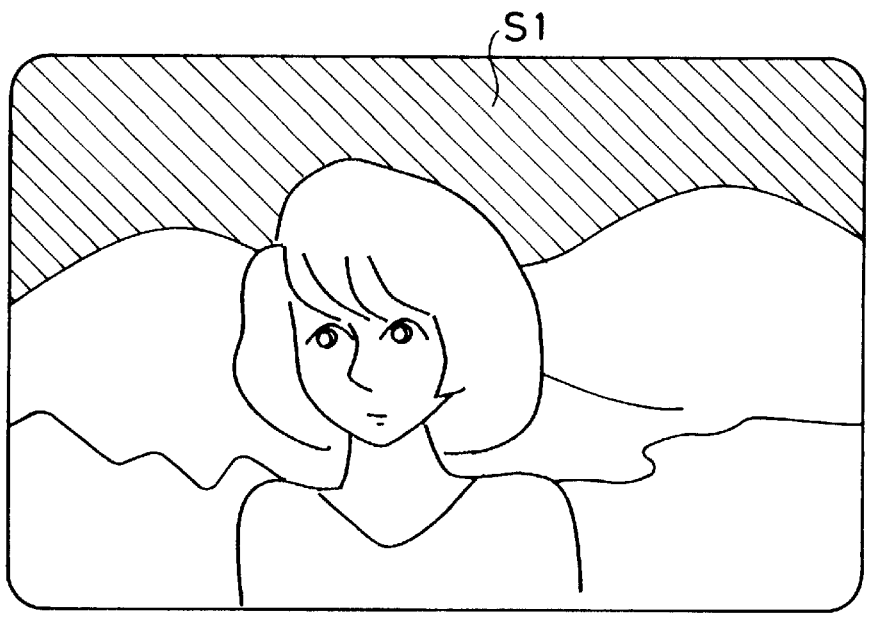
FIG. 7 is a diagram showing an example of a high luminance portion in a clear or cloudy photographic scene.

For example, when an image to be photographed is an outdoor scene on a clear or cloudy data as shown in FIG. 7, a portion S1 indicating the sky (portion hatched by normal lines) reflects the color temperature of the light source. Accordingly, this portion S1 is extracted as a high light portion.

Figure 8:
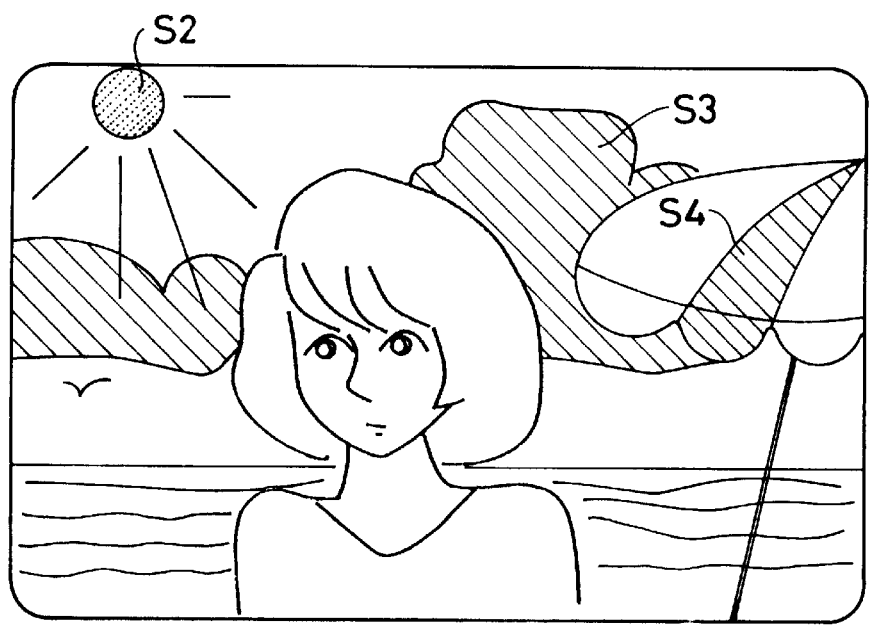
FIG. 8 is a diagram showing an example of a high luminance portion in an against-the-sun scene.

Further, in an against-the-sun scene as shown in FIG. 8, a portion S2 indicating the sun (portion hatched by dotted lines) shows the color temperature of the light source, and a portion S3 indicating a white cloud and a portion S4 indicating a white portion of a beach parasol (portions hatched by normal lines) reflect the color temperature of the light source. Accordingly, these portions S2 to S4 are extracted as high light portions.

Figure 9:
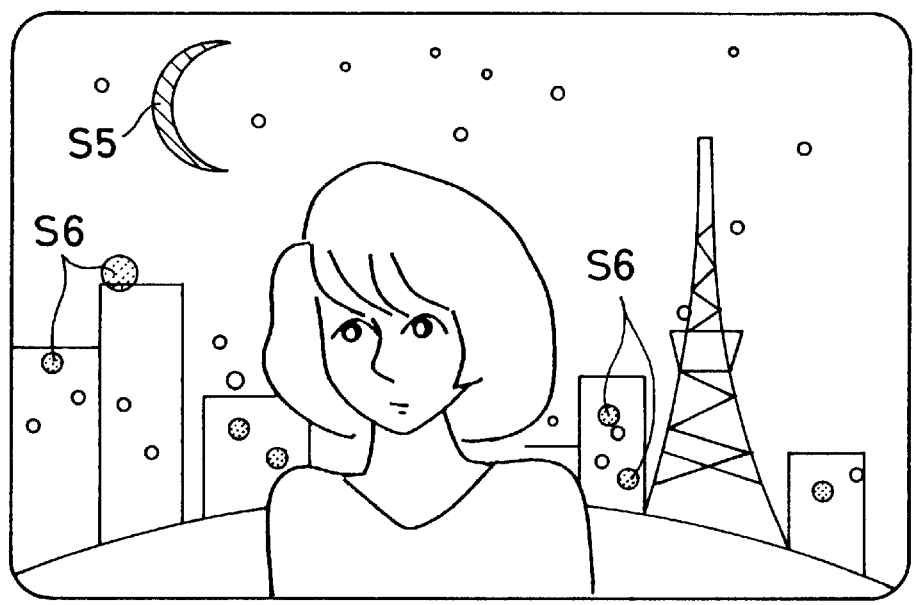
FIG. 9 is a diagram showing an example of a high luminance portion in a night scene.
Figure 10:
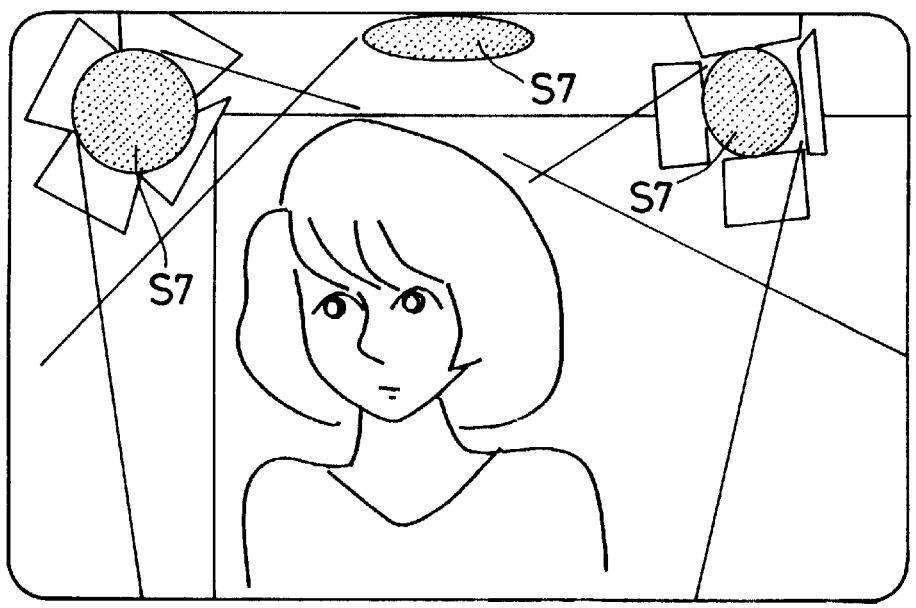
FIG. 10 is a diagram showing an example of a high luminance portion in an against-the-lights scene.

Further, in a night scene as shown in FIG. 9, a portion S5 indicating the moon (portion hatched by normal lines) and portions S6 indicating lights from buildings (portions hatched by dotted lines) shows the color temperature of the light source. Accordingly, these portions SS, S6 are extracted as high light portions. In an against-the-lights scene as shown in FIG. 10, since portions S7 indicating illumination lights (portions hatched by dotted lines) show the color temperature of the light source, these portions S7 are extracted as high light portions.

The image data of R- and B-components of the high light portions extracted by the low light clipping circuit 971 are input to the weighting circuit 973, and the image data of G-component is input to the high light area calculating circuit 972 and the weighting circuit 973.

The high light area calculating circuit 972 calculates a total area of the high light portions extracted by the low light clipping circuit 971 within a frame of the image. For example, the circuit 972 calculates the total area of the high light portions based on the number of pixels constituting the high light portions, and outputs the calculation result to the light source detection accuracy calculating circuit 977.

The weighting circuit 973 weights the level by multiplying the image data of the high light portions extracted by the low light clipping circuit 971 by a specified coefficient. The integral circuit 974 includes, for example, a CR integral circuit, integrates the image data of the high light portions in a specified cycle T for a specified period $\tau$ and averages the level of the high light portions.

The integration start timing and the integration period $\tau$ of the integral circuit 974 are controlled by the counter 987 to be described later. The integration period $\tau$ is set in advance to a suitable time, and the integration start timing is determined according to the reliability of the color temperature of the light source detected based on the image data of the high light portions.

The integral circuit 974 starts integrating (averaging) the level of the image data of the high light portions at the integration start timing input from the counter 987, and holds the integration result until a next integration start timing after integrating for the specified integration period $\tau$. Thus, the average levels R1, G1, B1 of the R-, G-, B-components of the high light portions are renewed in the specified cycle T.

The average levels R1, B1 of the image data of R- and B-components output from the integral circuit 974 are input to the color correction gain calculating circuit 975 and the chromaticity data converting circuit 976, and the average level G1 of the image data of G-component is input to the color correction gain calculating circuit 975, the chromaticity data converting circuit 976 and the light source detection accuracy calculating circuit 977.

The signal processing is applied to each of the image data of R-, G-, B-components in the low light clipping circuit 971, the weighting circuit 973 and the integral circuit 974.

The color correction gain calculating circuit 975 calculates the white balance adjustment data WBD1 (R1/G1, B1/G1) based on the average levels R1, G1, B1 of the image data of R-, G-, B-components. This calculation result is input to the mixing circuit 986.

The chromaticity data converting circuit 976 converts the average levels R1, G1, B1 of the image data of R-, G-, B-components into chromaticity coordinates (x-coordinate value, y-coordinate value) in a xy chromaticity diagram of the CIE (International Illumination Committee). The conversion into the chromaticity coordinates (x, y) is performed to, when the light source is detected to be included in the high light portion, calculate the reliability of this detection.

Figure 11:
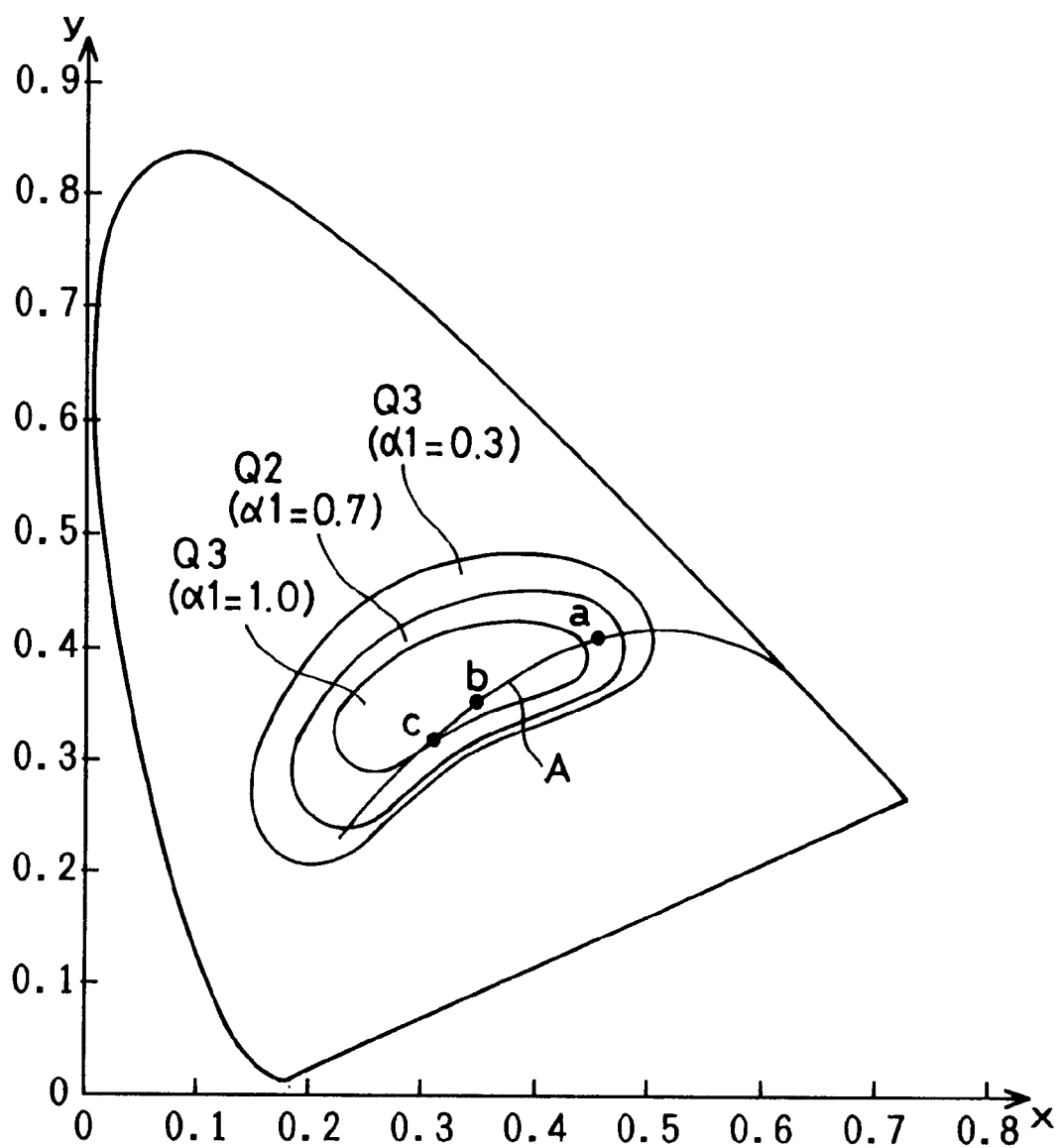
FIG. 11 is a graph showing a method for determining a detection accuracy of a color temperature of a high luminance portion on the basis of a CIE chromaticity chart.

More specifically, according to the xy chromaticity diagram, a trace A of the color temperature due to a temperature change of a black body (hereafter, a black body trace A) is shown as shown FIG. 11, and the color temperatures of a variety of light sources such as a tungsten white electric bulb (point a in FIG. 11), a sunlight (point b in FIG. 11) and a daylight (point c in FIG. 11) can be known. Accordingly, whether the light source is included in the high light portions can be estimated by comparing the chromaticity coordinates (x, y) with the black body trace A.

If the chromaticity coordinates (x, y) are located on or near the black body trace A, the accuracy of detection that the high light portions show the color temperature of the light source is substantially 100% reliable. However, the more the chromaticity coordinates (x, y) are deviated from the black body trace A, the less reliable the detection that the high light portions include the color temperature of the light source.

Accordingly, in this embodiment, the accuracy of the detection that the high light portions include the color temperature of the light source is empirically obtained in advance based on the chromaticity coordinates (x, y), and this detection accuracy is calculated based on the chromaticity coordinates (x, y) converted in the chromaticity data converting circuit 976.

In FIG. 11, portions Q1, Q2, Q3 enclosed by three ellipses formed in a center portion (white portion) of the xy chromaticity diagram show the detection accuracy. The portion Q1 is a portion including and near the black body trace A, i.e. a high accuracy portion where the detection accuracy is substantially 100% reliable. The portion Q2 outside the portion Q1 is an intermediate accuracy portion where the detection accuracy is relatively reliable, and the portion Q3 outside the portion Q2 is a low accuracy portion where the detection accuracy is low.

The $\alpha 1$ set for the respective portions Q1, Q2, Q3 is a light source detection accuracy coefficient used to calculate the addition ratio $\alpha$. A portion outside the portion Q3 is a portion where the detection accuracy is substantially 0% reliable and, accordingly, the coefficient $\alpha 1$ is "0".

The chromaticity coordinates (x, y) are calculated by converting the average levels (R1, G1, B1) of the image data of R-, G-, B-components into three stimulus values (X, Y, Z) of XYZ color specification,systems and by applying a specified calculation (x=X/(X+Y+Z), y=Y/(X+Y+Z)) to the three stimulus values. This calculation result is input to the light source detection accuracy calculating circuit 977 and the mixing circuit 986 together with the average level G1 of the image data of G-components.

The circuit 977 calculates the light source detection accuracy coefficient $\alpha 1$ based on the chromaticity coordinates (x, y), and also calculates an addition coefficient $\alpha 2$ based on the luminance level of the high light portions (the average level G1 of the image data of G-components) in accordance with a table set in advance. Then, the circuit 977 calculates the addition ratio $\alpha$ based on the coefficients $\alpha 1$, $\alpha 2$ and the total area data of the high light portions input from the high light area calculating circuit 972 in accordance with a table set in advance.

Figure 12:
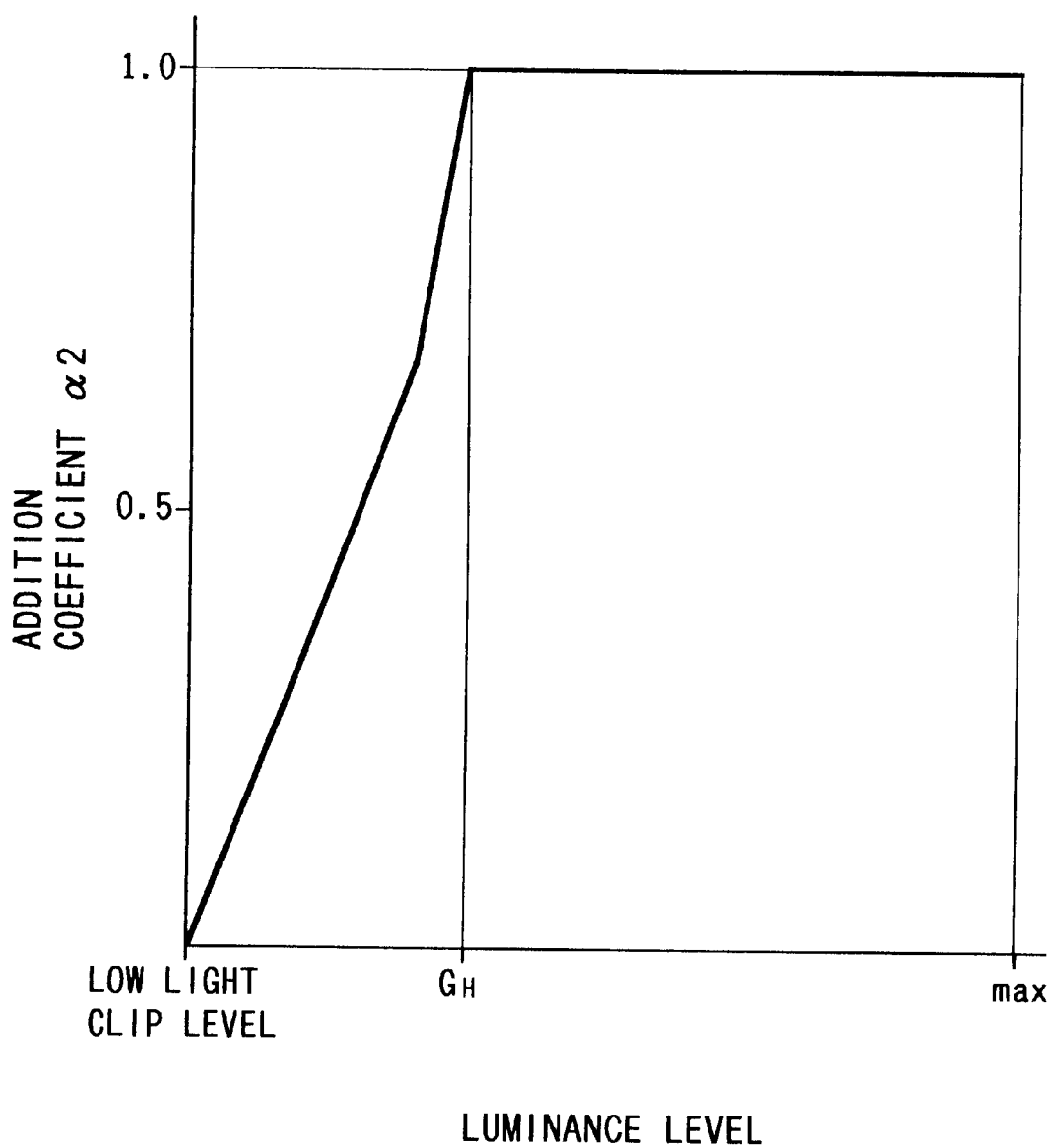
FIG. 12 is a chart showing a reference curve for calculating an addition coefficient α2.

FIG. 12 is a chart showing a reference curve used to calculate the addition coefficient $\alpha 2$.

In FIG. 12, the abscissa is a luminance level of the high light portions (i.e. the average level G1 of the image data of G-components of the high light portions) and the ordinate is the addition coefficient $\alpha 2$. The "max" on the abscissa corresponds to an upper limit value of the dynamic range of the CCD image sensor 6 (see the upper limit value of the dynamic range of FIG. 6), and the "low light clipping level" on the abscissa is a level set in the low light clipping circuit 971 based on the dc voltage $V_R$ of the CCD image sensor 6.

The reference curve shown in FIG. 12 operates in accordance with the photoelectric conversion characteristic of the CCD image sensor 6 (see FIG. 6). Specifically, if the luminance level (G1) of the high light portions is equal to or larger than a predetermined high level threshold $G_H$, the addition coefficient α2 is set to "1" on the assumption that the light source is most likely included in the high light portions. If the luminance level (G1) of the high light portions is below a predetermined high level threshold GH, the detection that the light source is included in the high light portions is not sufficiently reliable. Accordingly, the addition coefficient α2 is set at a specified value according to the luminance level of the high light portions in accordance with a predetermined curve obtained as a result of experiments or the like.

TABLE 1 shows examples of WB controls based on the detection result concerning the color temperature of the high light portions.

and, in principle, denotes a luminance level of the high light portions. "Supposed Scene" denotes a photographic scene of the object which is supposed on the basis of a combination of detection results of the "Portion of High Light Portion", "Black Body Trace" and "High Light Luminance Level".

"White Balance Correction" denotes qualitative contents of the white balance adjustment. "Addition Ratio" denotes contents of an addition control in the mixing circuit 986, wherein the letter "L" denotes "Light Source" which means the addition ratio (α×100[%]) of the white balance adjustment data WBD1 (R1/G1, B1/G1) calculated based on the image data in the high luminance portion and the letter "N" denotes "Normal" which means the addition ratio ((1−α)× 100[%]) of the white balance adjustment data WBD2 (R2/G2, B2/G2) calculated based on the image data in the low luminance portion.

(1) to (3) of TABLE 1 are cases where the area of the high light portions is large and the color temperature of the light source is supposed to be included in the high light portions.

TABLE 1

| CASE | AREA OF HIGH LIGHT PORTIONS | BLACK-BODY TRACE | HIGH LIGHT LUMINANCE LEVEL | SUPPOSED SCENE | WHITE BALANCE CORRECTION | RATIO | |
|---|---|---|---|---|---|---|---|
| (1) | large | blackbody trace | high | against-the-sun scene | based on WBD1 & amber correction | L | 100% |
| | | | | | | N | 0% |
| (2) | large | blackbody trace | intermediate | normal photographic scene | based on WBD1 | L | 100% |
| | | | | | | N | 0% |
| (3) | large | blackbody trace | low | white object in scene | based on average of WBD1 & WBD2 | varied | |
| (4) | small | blackbody trace | — | spot light source in scene | based on WBD2 | L | 0% |
| | | | | | | N | 100% |
| (5) | small | outside black-body trace | — | spot light source in scene | based on WBD2 | L | 0% |
| | | | | | | N | 100% |
| (6) | large | outside black-body trace | high | color electric bulb in scene | based on WBD2 | L | 0% |
| | | | | | | N | 100% |
| (7) | large | outside black-body trace | intermediate, low | afterglow scene | based on WBD2 & color failure correction | L | 0% |
| | | | | | | N | 100% |
| (8) | nothing | — | — | no color temperature information | based on WBD2 | L | 0% |
| | | | | | | N | 100% |

The reference curve used to calculate the addition ratio α is set in advance based on the WB controls shown in TABLE 1. The addition ratio α is set in a column "Addition Ratio" in each case of TABLE 1.

In TABLE 1, "Area of High Light Portions" is the total area of the high light portions extracted by the low light clipping circuit 971, and is the content of the output of the high light area calculating circuit 972.

"Black Body Trace" is a determination as to whether or not the light source is included in the high light portions. "Black Body Trace" denotes a possibility that the light source is included in the high light portions (the chromaticity coordinates (x, y) are located within the portions Q1 to Q3 in FIG. 11). "Outside Black Body Trace" denotes no possibility that the light source is included in the high light portions (the chromaticity coordinates (x, y) are located outside the portion Q3 in FIG. 11).

"High Light Luminance Level" is the average level G1 of the image data of G-components in the high light portions The case (1) is a case where the luminance level of the high light portions is high and the light source is supposed to be present in the high light portions, and is, for example, an against-the-sun scene as shown in FIG. 8. The case (2) is a case where the high light portions have an intermediate luminance level and the reflected light of the light source is supposed to be present in the high light portions, and is, for example, a normal photographic scene as shown in FIG. 7.

In the cases (1), (2), the average level G1 of the image data of G-components in the high light portions exceeds the high level threshold $G_H$, and an accurate color temperature information can be obtained from the high light portions. Accordingly, the addition coefficient α is set to "1". In other words, the amplifier gain control values ($AG_R$, $AG_B$) are generated based on the white balance adjustment data WBD1 (R1/G1, B1/G1).

The case (3) is a case where the luminance of the high light portions is low and nothing which reflects the color temperature of the light source is present, but a white reflective object is supposed to exist in the high light portions. In the case (3), since the average level G1 of the image data of G-components of the high light portions is below the high level threshold $G_H$, the addition coefficient $\alpha 2$ is set based on the average level G1 in accordance with the predetermined curve.

Accordingly, in the case (3), the addition coefficient $\alpha$ (=$(\alpha 1+\alpha 2)/2$) is set based on an average value of the light source detection accuracy coefficient $\alpha 1$ calculated based on the chromaticity coordinates (x, y) and the addition coefficient $\alpha 2$ calculated based on the average level G1, and the amplifier gain control values ($AG_R$, $AG_B$) are generated based on a value obtained by adding the white balance adjustment data WBD1 (R1/G1, B1/G1) obtained from the high luminance portion and the white balance adjustment data WBD2 (R2/G2, B2/G2) obtained from the low luminance portion at the addition ratio $\alpha$.

Cases (4) and (5) of TABLE 1 are cases where the area of the extracted high light portions is small and a spot light source is supposed to be included within a frame of image. In this case, even if the color temperature information of the light source can be obtained from the high light portions, it is not considered because it has little influence on the object.

Accordingly, in the cases (4), (5), the addition ratio $\alpha$ is set to "0", and the amplifier gain control values ($AG_R$, $AG_B$) are generated based on the white balance adjustment data WBD2 (R2/G2, B2/G2) obtained from the low luminance portion.

Cases (6) and (7) of TABLE 1 are cases where the area of the high light portions is large and the luminance level thereof is larger than the intermediate level, but the luminance level of the high light portions is determined not to reflect the white light source. An example of these cases is the photographic scene is supposed to be a color failure scene such as a scene having a color electric bulb as a light source or an afterglow scene.

In the cases (6) and (7), if the color temperature of the light source of the high light portions is considered, the WB adjustment may become even worse. Accordingly, the addition ratio $\alpha$ is set to "0" similar to the cases (4) and (5), and the amplifier gain control values ($AG_R$, $AG_B$) are generated based on the white balance adjustment data WBD2 (R2/G2, B2/G2) obtained from the low luminance portion.

Since the white balance adjustment data WBD2 generated from the image data of the low luminance portion is so corrected as to suppress an occurrence of color failure by a color failure clipping circuit 985 to be described later, a color failure correction is performed simultaneously with the WB adjustment in the case that the photographic scene is a color failure scene (case (7)).

Case (8) of FIG. 8 is a case where no high light portion is extractable. In this case, since the color temperature information of the light source cannot be obtained from the object image, the WB control similar to the one performed in the case (6) is performed.

Referring back to FIG. 2, the high light clipping circuit 981 clips the highlight portions of the image data and extracts the image data in the low luminance portion. As a clipping level, the same level as with the low light clipping circuit 981 is set. In the high light clipping circuit 981, portions except the portions S1 to S7 are extracted as low luminance portions in the examples of the photographic scenes of FIGS. 7 to 10.

The weighting circuit 982 and the integral circuit 983 correspond to the weighting circuit 973 and the integral circuit 974 of the light source judgment circuit 97, respectively, and calculate the average levels R2, G2, B2 of the image data of R-, G-, B-components in the low luminance portions.

The integration start timing and the integration period $\tau$ are controlled by the counter 987, and the average levels R2, G2, B2 of the image data of R-, G-, B-components in the low luminance portions are renewed in the specified cycle T.

The color correction gain calculating circuit 984 corresponds to the color correction gain calculating circuit 975, and calculates the white balance adjustment data WBD1 (R1/G1, B1/G1) based on the average levels R2, G2, B2 of the image data of R-, G-, B-components. This calculation result is input to the color failure clipping circuit 985.

The circuit 985 is adapted to suppress an occurrence of color failure caused by an excessive WB adjustment. When the white balance adjustment data WBD2 (R2/G2, B2/G2) exceeds the predetermined high level, it is clipped at this high level and output to the mixing circuit 986.

The mixing circuit 986 adds the white balance adjustment data WBD1 (R1/G1, B1/G1) input from the color correction gain calculating circuit 975 and the white balance adjustment data WBD2 (R2/G2, B2/G2) input from the color failure clipping circuit 985 at the addition ratio $\alpha$ input from the light source detection accuracy calculating circuit 977, and generates the amplifier gain control values ($AG_R$, $AG_B$) by taking inverses of the addition result.

The amplifier gain control values ($AG_R$, $AG_B$) are calculated according to Equations (5).

$$\frac{R}{G} = \alpha \frac{R1}{G1} + (1-\alpha)\frac{R2}{G2} \quad AG_R = \frac{1}{\frac{R}{G}}$$

$$\frac{B}{G} = \alpha \frac{B1}{G1} + (1-\alpha)\frac{B2}{G2} \quad AG_B = \frac{1}{\frac{B}{G}}$$

$$\alpha = \frac{\alpha 1 + \alpha 2}{2}$$

The counter 987 controls the integration periods of the integral circuits 974, 983 and controls the integration start timings of the integral circuits 974, 983 based on the light source detection accuracy coefficient $\alpha 1$ input from the light source detection accuracy calculating circuit 977. The counter 987 causes the integral circuits 974, 983 to operate only for the predetermined period $\tau$ and to hold the integration results for a predetermined period $T_{HLD}$. By alternately repeating the integration and the holding operation, the counter 987 causes the amplifier gain control values ($AG_R$, $AG_B$) to be renewed in the cycle T (=$T_{HLD}+\tau$). In a normal state, $T_{HLD}=0$ and $T=\tau$.

The integration period $\tau$ is set to a suitable time such as about several seconds so as to average the image data of several frames of image. The amplifier gain control values can be calculated if the average level of the image data of at least one frame is calculated. However, for example, in the case that a moving object is photographed or the same object is photographed while changing its angle of view by panning or zooming, if the amplifier gain control values are calculated according to the change of the frame image and the white balance is adjusted accordingly, the amplifier gain control values change, with the result that the color balance may fluctuate. Thus, in order to avoid such a disadvantage, the integration period $\tau$ is relatively set long as described above.

The holding period $T_{HLD}$ of the integration result is variably settable such that it becomes longer as the light source detection accuracy coefficient $\alpha 1$ becomes larger. If the light source is stable in the photographing of the moving object or in the photographing by panning or zooming, the color temperature of the light source is substantially constant even if the photographic scene changes. Thus, it is preferable to adjust the white balance in a suitable cycle longer than the integration period τ.

In this embodiment, the color temperature of the light source is detected based on the image to be photographed and the detection accuracy is calculated. The holding period $T_{HLD}$ of the integration result is changed according to the calculated detection accuracy so as to more finely adjust the WB adjustment cycle T.

More specifically, when the light source detection accuracy coefficient α1 is large, the color temperature of the light source is supposed to be detected from the image to be photographed with high accuracy and the light source of the object is supposed to be stable. Accordingly, a renewal cycle $(T_{HLD}+\tau)$ of the amplifier gain control values $(AG_R, AG_B)$ is made longer by lengthening the holding period $T_{HLD}$.

Next, the operation of the image pick-up apparatus 1 is briefly described with respect to the case where the photographic scene of FIG. 7 is to be photographed.

A light image of an object passed through the lens system 2 is separated, by the dichroic prism 5, into light images of the respective color components of R, G, B which are formed on the sensing surfaces of the CCD image sensors 6(R), 6(G), 6(B).

Upon receipt of the control pulse $\phi_D$ from the timing generator 7, the CCD image sensors 6(R), 6(G), 6(B) start the exposure. Upon lapse of the predetermined exposure period Tv set by the exposure control value calculating circuit 95, the shift pulse $\phi_S$ is input to the CCD image sensors 6(R), 6(G), 6(B) from the timing generator 7, thereby completing the exposure.

Electric charges logarithmically compressed in relation to the amount of incident light are stored for the exposure period Tv in the charge storing portions 62 of the CCD image sensors 6(R), 6(G), 6(B). The image signals made up of the stored electric charges are output to the CDS circuit 81 in synchronism with the first and second transfer pulses ϕ1, ϕ2 input from the timing generator 7. The image signals of R-, G-, B-components are amplified to the specified standard level by the preamplifier 82 after having their noises suppressed by the CDS circuit 81. Then, the white balance of these image signals are adjusted by the WB circuit 83 in accordance with the amplifier gain control values $(AG_R, AG_B)$ input from the color correction value calculating circuit 98 via the D/A converter 99.

The image signals of R-, G-, B-components having the white balance thereof adjusted are converted into digital image data by the A/D converter 84. The γ correction and the outline correction are applied to the thus obtained digital image data by the γ correction circuit 91 and the enhancer unit 92 based on the γ correction data input from the exposure control value calculating circuit 95 and the outline correction data input from the outline correction control circuit 96. Thereafter, the image data are converted again into analog image signals by the D/A converter 93 and output to an unillustrated circuit at a subsequent stage.

The image data of R-, G-, B-components are also input to the Y matrix circuit 94. Based on the luminance data generated by the Y matrix circuit 94, the dc voltage $V_R$ and the γ correction data are calculated in the exposure control value calculating circuit 95, and the outline correction data is generated in the outline correction control circuit 96.

The image data of R-, G-, B-components are also input to the light source judgment circuit 97 which in turn extracts the high luminance portions (portion S1 representing the sky) and the white balance adjustment data WBD1 (R1/G1, B1/G1) based on the image data of R-, G-, B-components constituting the portion S1. Further, the circuit 97 calculates the total area and the average luminance level of the portion S1 and the color temperature of the light source by the chromaticity coordinates, and the color temperate of the light source in the portion S1 is estimated based on these three factors. The addition ratio α is set based on the accuracy of the estimation (light source detection accuracy coefficient α1, addition coefficient α2).

The image data of R-, G-, B-components are also input to the color correction value calculating circuit 98 which in turn extracts the low luminance portions (portions other than the sky portion S1) and calculates the white balance adjustment data WBD2 (R2/G2, B2/G2) based on the image data of R-, G-, B-components constituting the low luminance portions.

The white balance adjustment data WBD1 (R1/G1, B1/G1) and WBD2(R2/G2, B2/G2) are added at the addition ratio α, and the amplifier control values $(AG_R, AG_B)$ are generated by taking inverses of the addition result.

The amplifier gain control values $(AG_R, AG_B)$ are fed back to the WB circuit 83 after being converted into analog signals by the D/A converter 99.

During the first image pick-up operation after the activation of the apparatus 1, the image is picked up and the processing is applied to the image signals while the dc voltage $V_R$, the exposure period Tv and the amplifier gain control values $(AG_R, AG_B)$ are set to predetermined initial values. Thereafter, the dc voltage $V_R$ and the amplifier gain control values $(AG_R, AG_B)$ set by the exposure control value calculating circuit 95 and the light source judgment circuit 97 and the color correction value calculating circuit 98 are renewably set at a specified timing or in a specified cycle.

As described above, according to this embodiment, the image signals representing the image in the high luminance portions are read without overflow using the CCD image sensors 6 having a logarithmic photoelectric conversion characteristic. The color temperature of the light source of the object is estimated based on the read image signals, and the accuracy of this estimation is calculated. The amplifier gain control values $(AG_R, AG_B)$ used to adjust the white balance are set in consideration of the color temperature of the light source based on the calculated accuracy. Accordingly, the white balance adjustment can be performed with high accuracy.

Particularly, the detection accuracy concerning the color temperature of the light source in the high luminance portions is set on the basis of three factors the area of the high luminance portions, the average luminance level and the chromaticity coordinates. Accordingly, the color temperature of the light source in a variety of photographic scenes can be estimated with relatively high accuracy, and the white balance suitable for the photographic scene can be performed.

As described above, according to the invention, an object image is picked up by image pick-up means including a plurality of photoelectric conversion elements having a logarithmic characteristic, and data used to adjust the white balance are generated based on the color temperature of the light source included in specified high luminance portions within an image to be picked up. Accordingly, a precise color correction can be performed based on the color temperature information of the light source independently of the photographic scene. Further, since a variety of photographic scenes such as a normal scene, an against-the-sun scene and a night scene can be predicted with high accuracy, a preferable color correction suitable for the photographic scene can be performed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image pick-up apparatus comprising:

an image sensing section which photoelectrically converts light from an object into an electrical output having a logarithmic function in relation to an amount of the light to produce image data regarding a light image of the object, the image data forming a plurality of image pixels corresponding to different areas of a photographic scene;

a detecting section which detects a color temperature of a light source in connection with the object based on image data from the image sensing section; and a correcting section which generates a first white balance adjustment data based only on image data regarding a portion of the light image having a high-magnitude luminance and a second white balance adjustment data based only on image data regarding a portion other than the high-magnitude luminance portion, and corrects image data from the image sensing section based on said first and second white balance adjustment data.

2. An image pick-up apparatus as defined in claim 1, wherein the detecting section detects a color temperature of the light source based on image data regarding a particular portion of the light image, the particular portion having a specified luminance.

3. An image pick-up apparatus as defined in claim 2, wherein the image sensing section has a changeable photoelectric conversion range in relation to an amount of the light and the specified luminance of the particular portion is changeable with a changed photoelectric conversion range.

4. An image pick-up apparatus as defined in claim 1, wherein the detecting section calculates an accuracy of premise that the light image has a light source, and the correcting section generates white balance adjustment data in accordance with a calculated accuracy.

5. An image pick-up apparatus comprising:

an image sensing section which photoelectrically converts light from an object into an electrical output having a logarithmic function in relation to an amount of the light to produce image data regarding a light image of the object, the image data forming a plurality of image pixels corresponding to different areas of a photographic scene;

an extracting section which extracts a particular portion having a specified luminance from the light image;

a discriminating section which discriminates whether the particular portion has a light source;

a data generating section which generates white balance adjustment data of the image data at a specified timing interval; and a changing section which changes said timing interval to set a longer interval when the discriminating section determines that the particular portion has a light source.

6. An image pick-up apparatus as defined in claim 5, further comprising a calculating section which calculates an accuracy of the discrimination of the discriminating section, wherein the changing section changes the generation interval based on a calculated discrimination accuracy.

7. An image pick-up apparatus as defined in claim 6, wherein the changing section sets an interval longer than a predetermined interval when the accuracy is higher than a predetermined value.

8. An image pick-up apparatus as defined in claim 5, further comprising a detecting section which detects a color temperature of a light source in the particular portion, wherein the data generating section generates white balance adjustment data based on a detected color temperature of the light source.

9. An image pick-up apparatus comprising:

an image sensing section which photoelectrically converts light from an object into an electrical output having a logarithmic function in relation to an amount of the light to produce image data regarding a light image of the object, the image data forming a plurality of image pixels corresponding to different areas of a photographic scene;

an extracting section which extracts a particular portion having a specified luminance from the light image;

an estimating section which classifies the image data as representing one of a plurality of different categories of photographic scenes, based on the image data regarding the particular portion, by calculating the area of the particular portion and estimating a photographic scene based on the calculated area; and a correcting section which corrects image data from the image sensing section based on the classification determined by the estimating section.

10. An image pick-up apparatus as defined in claim 9, wherein the estimating section estimates a photographic scene based on a color temperature of the particular portion.

11. An image pick-up apparatus as defined in claim 9, wherein the estimating section further calculates a luminance level of the particular portion, and estimates a photographic scene based on a calculated luminance level.

12. An image pick-up apparatus as defined in claim 9, wherein the estimating section calculates an area, a luminance level and a color temperature of the particular portion, and estimates a photographic scene based on a calculated area, luminance level and color temperature.

* * * * *